United States Patent
Vargantwar et al.

(10) Patent No.: US 12,550,174 B2
(45) Date of Patent: Feb. 10, 2026

(54) SYSTEMS AND METHODS FOR TRANSITIONING BETWEEN OPERATING MODES ASSOCIATED WITH BANDWIDTH PARTS FOR EFFICIENT BATTERY CONSUMPTION

(71) Applicant: Verizon Patent and Licensing Inc., Basking Ridge, NJ (US)

(72) Inventors: Sachin Vargantwar, Cumming, GA (US); Chin Chiu, Allen, TX (US); Jack Anthony Smith, Melissa, TX (US); Matthijs Andries Visser, Randolph, NJ (US); Yuexin Dong, Bridgewater, NJ (US); Chokri Trabelsi, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/661,624

(22) Filed: May 11, 2024

(65) Prior Publication Data
US 2024/0298340 A1      Sep. 5, 2024

Related U.S. Application Data

(63) Continuation of application No. 17/645,159, filed on Dec. 20, 2021, now Pat. No. 11,991,727.

(51) Int. Cl.
| | |
|---|---|
| *H04W 72/52* | (2023.01) |
| *H04W 24/08* | (2009.01) |
| *H04W 72/044* | (2023.01) |
| *H04W 72/23* | (2023.01) |

(52) U.S. Cl.
CPC .......... *H04W 72/52* (2023.01); *H04W 24/08* (2013.01); *H04W 72/044* (2013.01); *H04W 72/23* (2023.01)

(58) Field of Classification Search
CPC ..... H04W 76/27; H04W 72/23; H04W 72/52; H04W 24/08; H04W 72/044; H04W 72/0453
See application file for complete search history.

(56) References Cited

U.S. PATENT DOCUMENTS

| | | |
|---|---|---|
| 11,864,109 B2 | 1/2024 | Park et al. |
| 12,089,203 B2 * | 9/2024 | MolavianJazi ... H04W 72/0453 |
| 2011/0044174 A1 * | 2/2011 | Szymanski ......... H04L 47/6295 |
| | | 370/238 |

(Continued)

*Primary Examiner* — Brian D Nguyen

(57) ABSTRACT

A device may determine traffic information of a user equipment (UE) operating in a first operating mode. The first operating mode may be associated with the UE monitoring a physical downlink control channel (PDCCH), via a first bandwidth part (BWP), according to a first rate. The device may determine, based on the traffic information, that the UE is to operate in a different operating mode including one of: a second operating mode associated with monitoring the PDCCH, via the first BWP, according to a second rate exceeding the first rate, a third operating mode associated with monitoring the PDCCH, via a second BWP less than the first BWP, according to the second rate, or a fourth operating mode associated with monitoring the PDCCH, via the second BWP, according to the first rate. The device may cause the UE to transition to the different operating mode.

20 Claims, 9 Drawing Sheets

(56) References Cited

U.S. PATENT DOCUMENTS

| | | | |
|---|---|---|---|
| 2011/0235509 A1* | 9/2011 | Szymanski | H04L 47/30 |
| | | | 370/230 |
| 2020/0059879 A1 | 2/2020 | Nam et al. | |
| 2021/0006366 A1 | 1/2021 | Zhou et al. | |
| 2023/0007517 A1 | 1/2023 | Wang et al. | |
| 2023/0088580 A1 | 3/2023 | Priyanto et al. | |
| 2023/0284145 A1 | 9/2023 | Da Silva et al. | |
| 2023/0308905 A1* | 9/2023 | Teyeb | H04L 5/0035 |
| 2023/0353297 A1 | 11/2023 | Abdelghaffar et al. | |
| 2023/0388884 A1* | 11/2023 | Freda | H04W 36/0085 |
| 2024/0015757 A1 | 1/2024 | Li et al. | |

* cited by examiner

SYSTEMS AND METHODS FOR TRANSITIONING BETWEEN OPERATING MODES ASSOCIATED WITH BANDWIDTH PARTS FOR EFFICIENT BATTERY CONSUMPTION

RELATED APPLICATION

This application is a continuation of U.S. patent application Ser. No. 17/645,159, now U.S. Pat. No. 11,991,727, entitled "SYSTEMS AND METHODS FOR TRANSITIONING BETWEEN OPERATING MODES ASSOCIATED WITH BANDWIDTH PARTS FOR EFFICIENT BATTERY CONSUMPTION," filed Dec. 20, 2021, which is incorporated herein by reference in its entirety.

BACKGROUND

Fifth Generation/New Radio (5G/NR) provides various enhancements to wireless communications, such as flexible bandwidth allocation, improved spectral efficiency, ultra-reliable low-latency communications (URLLC), beamforming, high-frequency (e.g., millimeter wave (mmWave)) communication, and/or other enhancements.

DETAILED DESCRIPTION OF PREFERRED EMBODIMENTS

Figure 1A:
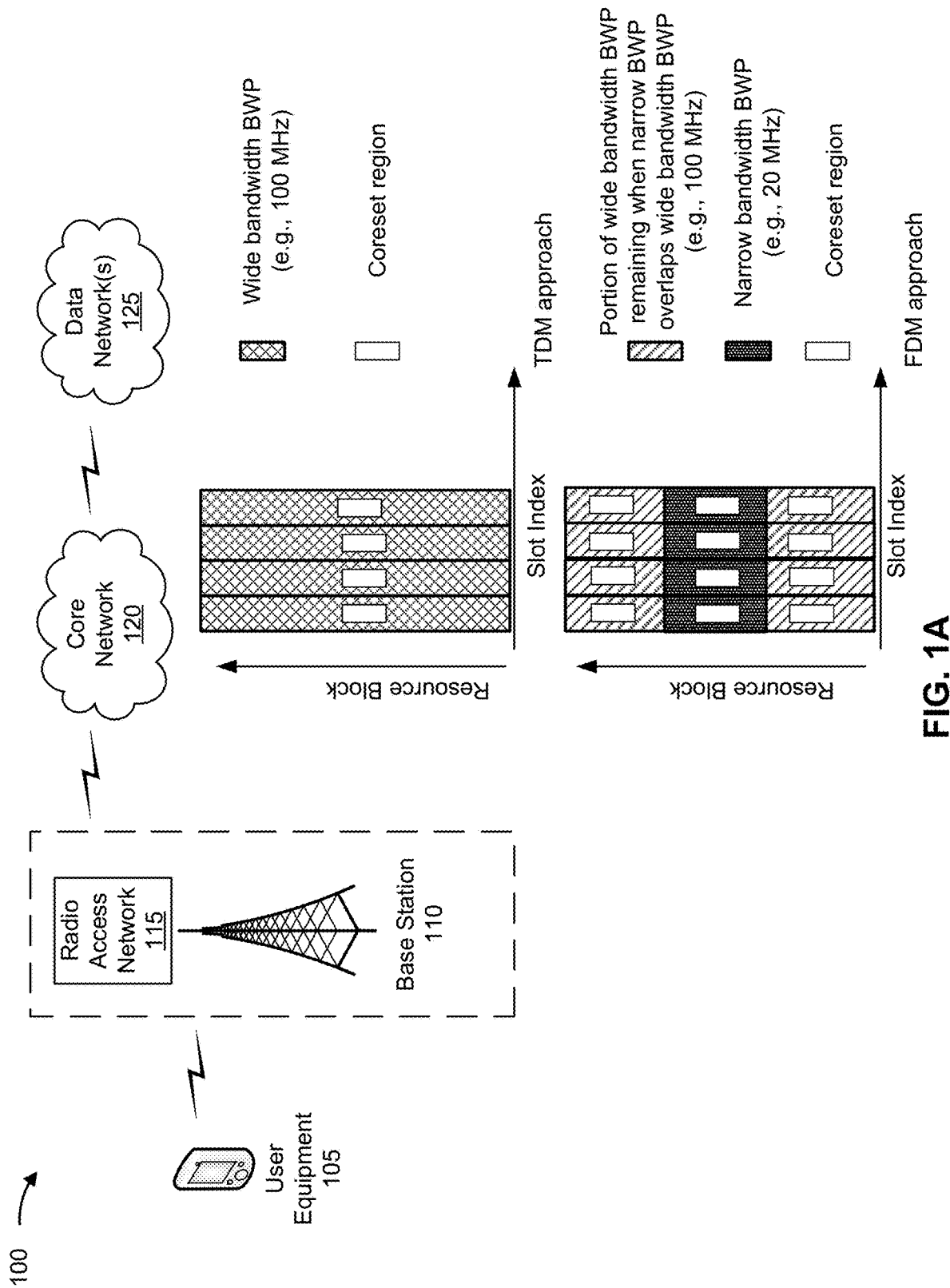
FIGS. 1A-1F are diagrams of an example associated with transitioning between operating modes associated with bandwidth parts.

The following detailed description of example implementations refers to the accompanying drawings. The same reference numbers in different drawings may identify the same or similar elements.

5G/NR has been designed to support a vast array of different use cases with data rates ranging from a few bits transmitted very infrequently (e.g., once per month) to very high data rates capable of supporting augmented reality devices, video communications, among other examples. Unfortunately, device energy consumption is generally proportional to the bandwidth that is being demodulated. Accordingly, in order to prevent the low-bitrate devices from having unnecessarily short battery lives, 5G/NR was designed to allow the carrier bandwidth to be subdivided into a number of smaller portions, with each portion being designed to support a particular set of use cases. These smaller portions are referred to as bandwidth parts (BWPs). As an example, a 100 MHz carrier bandwidth can be divided into two BWPs, one BWP of 10 MHz to handle text-messages and voice traffic, and another BWP of 90 MHz to handle high data rate applications.

A user equipment (UE) can be configured to operate according to four different BWPs and can be caused to dynamically switch between the four different BWPs as a result of a radio resource control (RRC) message, a medium access control (MAC) protocol data unit (PDU), among other examples. Physical downlink control channel (PDCCH) monitoring of each of the four different BWPs can be configured according to a different monitoring rate for each BWP.

Switching between BWPs can be a complicated process due to multiple constraints. One constraint is that the number of control channel elements (CCEs) needed to communicate with a UE generally increases as a distance between the UE and a cell increases. In some cases, smaller bandwidth BWPs may not have sufficient CCEs allocated to communicate with UEs that are distant from the cell. Another constraint is that smaller bandwidth BWPs have only a relatively small amount of total control resources available to communicate with UEs assigned to such smaller bandwidth BWPs. Accordingly, such smaller bandwidth BWPs can become easily congested as the number of UEs assigned to the smaller bandwidth BWPs increases.

A similar constraint also applies to the data transfer portion of BWP resources (e.g., physical downlink shared channel (PDSCH)). A BWP can easily become congested if a total load of all UEs assigned to the BWP substantially exceeds a data transfer capability of the BWP. Additionally, 5G/NR was designed to support devices with stringent latency requirements, introducing a further constraint. In this regard, sparse PDCCH monitoring (for control messages) may be unsuitable for UEs associated with stringent latency requirements.

The complexity of dealing with the aforementioned constraints has led manufacturers of UEs to sacrifice performance for simplicity. One manufacturer may simply configure UEs to switch between two identically-sized wideband BWPs (e.g., 100 MHz). For example, one BWP may be configured for sparse PDCCH monitoring (e.g., monitoring 1 out of a threshold number of slots (e.g., 1 out of 5 slots)) and another BWP may be configured for full PDCCH monitoring (e.g., monitoring every slot). This combination of BWPs essentially consists of a time-division-multiplexed (TDM) approach for BWP-based energy savings.

Another manufacturer may configure all UEs to switch between a narrowband BWP (e.g., 20 MHz) and a wideband BWP (e.g., 100 MHz), which is effectively a frequency-division-multiplexed (FDM) approach for BWP-based energy savings. Unfortunately, the problem with this approach is that the 20 MHz BWP has limited capacity on the PDCCH and PDSCH channels. In this regard, to alleviate possible congestion on the 20 MHz BWP, the UEs are configured with a set of switching criteria that reduces a likelihood of the UEs switching to the 20 MHz BWP. Therefore, existing UEs consume an undesirable amount of energy or do not have the ability to satisfy a performance associated with stringent latency requirements.

Implementations described herein are directed to configuring a UE to utilize a combination of the TDM approach and the FDM approach to enable optimal battery consumption while satisfying stringent latency requirements. For example, a base station may be configured to cause the UE to transition between different operating modes associated with the TDM approach and the FDM approach. The base station may cause the device to transition between the different operating modes based on traffic information (e.g., traffic statistics of a traffic flow) associated with the device and/or based on a load associated with resources allocated for the different operating modes.

For example, the UE may be initially assigned to a wideband BWP (e.g., 100 MHz) configured for sparse PDCCH monitoring, while traffic information are being gathered for the UE. The traffic information may include information regarding a quantity of PDUs exchanged between the UE and the base station, a packet size of packets exchanged between the UE and the base station, a latency requirement associated with the UE, and/or a PDCCH aggregation level associated with the UE. After a sufficient amount of traffic information is gathered for the UE, the UE may be transitioned to another operating mode that is more suitable to the UE, based on the traffic information of the UE. The sufficient amount of traffic information may refer to a particular number of packets exchanged between the UE and the base station. The particular number may be determined by a network planner. In some implementations, the particular number may be ten packets. The value of the particular number is merely provided as an example. Other values may be used in different situations.

In some situations, resources allocated to the different operating modes may be monitored to prevent any possible congestion regarding the resources. For example, as a load associated with the resources (allocated for an operation mode) satisfies a threshold, one or more UEs assigned to the operation mode may be transitioned to another operating mode that is more suitable to the one or more UEs (e.g., based on the traffic information of the one or more UEs). By transitioning between the different operating modes in this manner, the UE may operate in a manner that improves battery consumption without degrading performance of the UE. For example, the UE may be configured for optimal battery consumption while satisfying stringent latency requirements.

FIGS. 1A-1F are diagrams of an example 100 associated with transitioning between operating modes associated with bandwidth parts. As shown in FIG. 1A, example 100 includes a UE 105, a base station 110, a radio access network (RAN) 115, a core network 120, and one or more data networks 125 (referred to individually as "data network 125" and collectively as "data networks 125"). Example 100 illustrates various portions of a wireless telecommunications system (referred to herein as a "wireless network"). The wireless network may be a 5G wireless telecommunications system, a 4G wireless telecommunications system, a long-term evolution (LTE) wireless telecommunications system, or an LTE-Advanced (LTE-A) wireless telecommunications system. UE 105, base station 110, RAN 115, core network 120, and data networks 125 are described in more detail below in connection with FIG. 2.

In some examples, UE 105 may be wirelessly connected to RAN 115 at base station 110. Base station 110 may be connected to data network 125 via core network 120. Base station 110 may configure different UEs to implement the TDM approach, the FDM approach, or a combination of the TDM approach and the FDM approach. An example of the TDM approach is illustrated in FIG. 1A. The TDM approach may utilize a wideband BWP, such as 100 MHz. As shown in FIG. 1A, the horizontal axis represents a time index, and the vertical axis represents a frequency index. As further shown in FIG. 1A, each slot may include one or more CORESET regions (e.g., a region of the wideband BWP associated with a control resource set). A number of CORESETs, of the CORESET regions, may allow base station 110 to send control messages to UEs. Base station 110 may configure one or more UEs (assigned to this wideband BWP) to implement this TDM approach by configuring the one or more UEs that are assigned to monitor this wideband BWP to decode the PDCCH only once every predetermined number of slots (e.g., once every 5 slots).

An example of the FDM approach is illustrated in FIG. 1A. The FDM approach utilizes a wideband BWP (e.g., 100 MHz) and a narrowband BWP (e.g., 20 MHz). As shown in FIG. 1A, the narrowband BWP overlaps a portion of the wideband BWP. Base station 110 may configure UEs with information regarding the wideband BWP and information regarding the narrowband BWP. When the UEs are configured in this manner, the UEs that are switched to the narrowband BWP may monitor the CORESET defined within the narrowband BWP region for control messages, while UEs that are switched to the wideband BWP may monitor the CORESET defined within the wideband BWP for control messages.

In some examples, CORESETs defined in different BWPs can be defined using different numbers of symbols. As an example, the CORESETs defined in the wideband BWP may be configured using a single symbol, while CORESETs defined in the narrowband BWP may be configured using three symbols. By defining the CORESETs in this manner, a larger portion of the narrowband resources may be allocated to CCEs, thereby increasing a range of UEs that can be assigned to the narrowband BWP.

Figure 1B:
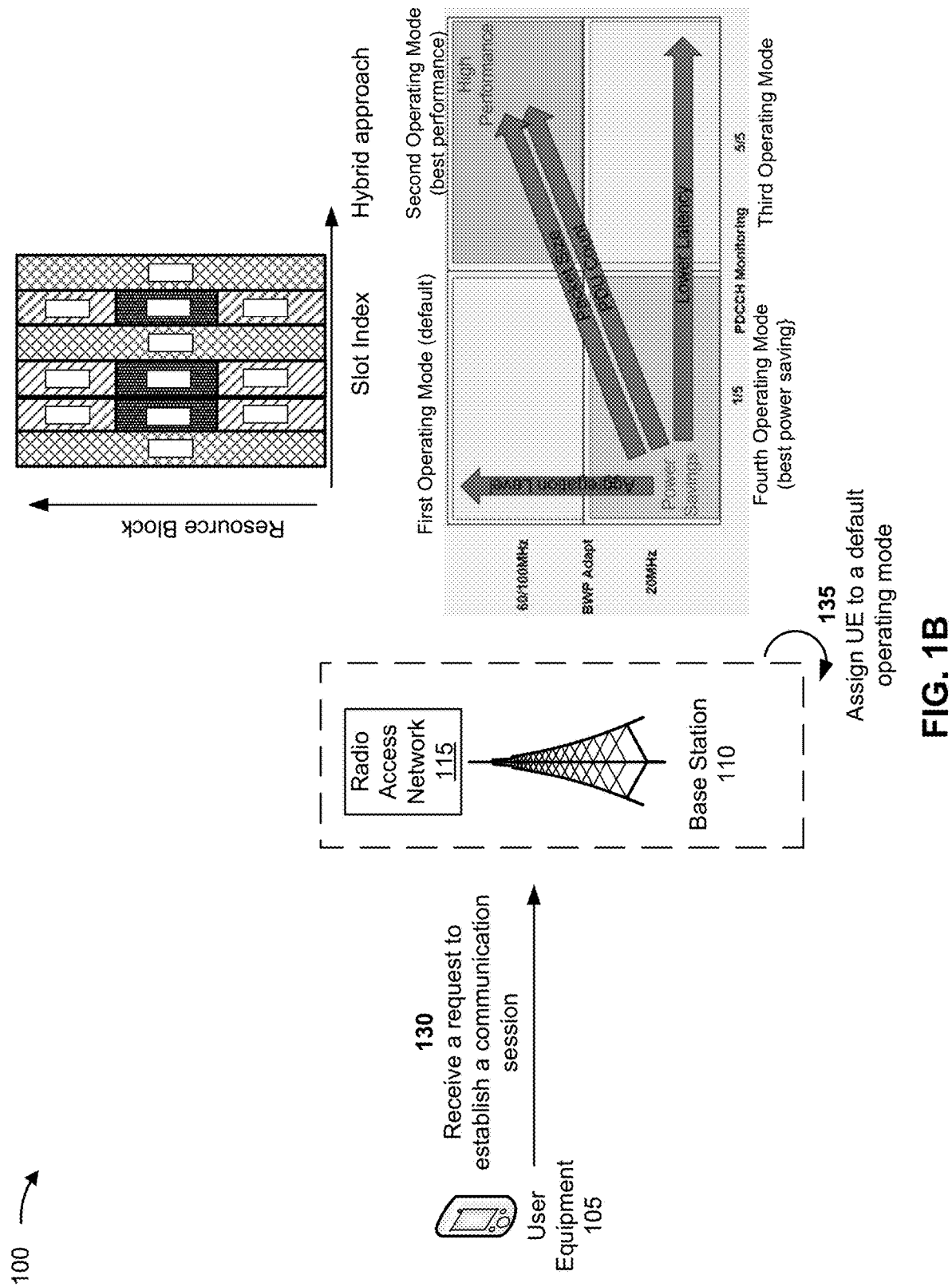

As shown in FIG. 1B, base station 110 may configure UEs to implement a combination of the TDM approach and the FDM approach. By configuring the UEs in this manner, base station 110 may be provided with a greater flexibility in serving a wide range of UEs. In some examples, base station 110 may use a selection algorithm to decide a manner in which each slot may be used, on a slot-by-slot basis. As an example, base station 110 may determine to use a slot as a wideband BWP slot and allocate resources across an entire bandwidth to UEs configured to monitor the wideband BWP (e.g., based on latency requirements). Alternatively, base station 110 may determine to use the slot as a narrowband BWP slot and allocate resources within the narrowband BWP to UEs configured to monitor the narrowband BWP (e.g., based on a measure of PDCCH aggregation). Alternatively, base station 110 may determine to allocate all or a portion of the resources corresponding to the narrowband BWP to UEs configured to monitor the narrowband BWP, and allocate all or a portion of the remaining resources to UEs configured to the wideband BWP.

When configuring UEs to implement the combination of the TDM approach and the FDM approach, base station 110 may configure the UEs to operate in different operating modes. As shown in FIG. 1B, the operating modes may include a first operating mode, a second operating mode, a third operating mode, and a fourth operating mode. The first operating mode may be associated with monitoring the PDCCH (or the PDSCH), via a first BWP, according to a first rate. For example, when operating under the first operating mode, the UEs may monitor the wideband BWP to decode the PDCCH (or the PDSCH) only once every predetermined number of slots (e.g., once every 4 slots, or once every 5 slots). The first operating mode may be a first one of two intermediate power saving modes. The first operating mode may be suitable for UEs that do not have stringent latency requirements but do have packet sizes that may be too large to be accommodated by the narrowband BWP (e.g., too large to be transmitted via the narrowband BWP).

The second operating mode may be associated with monitoring the PDCCH (or the PDSCH), via the first BWP, according to a second rate that exceeds the first rate. For example, when operating under the second operating mode, the UEs may monitor the wideband BWP to decode the PDCCH (or the PDSCH) every slot. The second operating mode may prioritize maximum performance over power savings.

The third operating mode may be associated with monitoring the PDCCH (or the PDSCH), via a second BWP, according to the second rate. For example, the UEs may monitor the narrowband BWP to decode the PDCCH (or the PDSCH) every slot. The third operating mode may be a second one of the two intermediate power saving modes. Typically, the third operating mode may be suitable for UEs associated with low latency requirements and small packet sizes that may be accommodated by the narrowband BWP.

The fourth operating mode may be associated with monitoring the PDCCH (or the PDSCH), via the second BWP, according to the first rate. For example, when operating under the fourth operating mode, the UEs may monitor the narrowband BWP to decode the PDCCH (or the PDSCH) only once every predetermined number of slots (e.g., once every 4 slots, or once every 5 slots). The fourth operating mode may provide the greatest power savings out of the previous operating modes discussed above. The fourth operating mode may be suitable for UEs that do not have stringent latency requirements and have packet sizes that are small enough to be accommodated by the narrowband BWP.

The amount of bandwidth and the rate at which a communication channel is monitored are merely provided as example. In practice, other amounts of bandwidth and other rates at which a communication channel is monitored may be used in different situations.

Base station 110 may configure the UEs to transition between different operating modes based on different constraints regarding traffic associated with the UEs. For example, base station 110 may cause the UEs to transition from the fourth operating mode to the first operating mode as a measure of the PDCCH aggregation level (associated with the UEs) increases. Additionally, or alternatively, base station 110 may cause the UEs to transition to the third operating mode, as a latency requirement (for the UEs) increases (e.g., as the UEs execute applications that require lower latency). Additionally, or alternatively, base station 110 may cause the UEs to transition to the first operating mode as packet size of packets exchanged between the UEs and base station 110 increases or as a quantity of packets (e.g., PDU) exchanged between the UEs and base station 110 increases. In light of the foregoing, base station 110 may configure the UEs for best power savings based on an ability to configure the UEs to use the TDM approach and the FDM approach.

As shown in FIG. 1B, and by reference number 130, base station 110 may receive a request to establish a communication session. For example, UE 105 may provide the request to establish the communication session with data network 125, and base station 110 may receive the request from UE 105. UE 105 may provide the request as part of UE 105 executing an application (e.g., a voice call application, a video call application, a gaming application, a streaming application, among other examples).

As shown in FIG. 1B, and by reference number 135, base station 110 may assign UE 105 to a default operating mode. For example, base station 110 may determine that the communication session is a new communication session between UE 105 and base station 110. Based on determining that the communication session is a new communication session, base station 110 may determine that a sufficient amount of traffic information, regarding UE 105, has not been obtained in order to identify an appropriate operating mode for UE 105. Accordingly, base station 110 may configure UE 105 to operate in the default operating mode.

Resources, allocated for a BWP associated with the default operating mode, may be associated with a load. In some implementations, base station 110 may determine whether the load satisfies a first load threshold. Base station 110 may configure UE 105 to operate in the default operating mode if the load does not satisfy the first load threshold. In some examples, base station 110 may cause UE 105 to be assigned to an interlace (of a BWP associated with the default operating mode) that is associated with a lowest PDCCH load. An interlace may refer to a slot of a plurality of slots associated with the BWP. Base station 110 may cause information regarding the load to be updated based on UE 105 being assigned to the default operation mode (or to the interlace). The first load threshold may be determined by a network planner.

In some implementations, base station 110 may cause a notification to be provided to UE 105. The notification may indicate that UE 105 is to operate in the default operating mode. In some situations, the notification may include information identifying a BWP associated with the default mode, information identifying a rate at which a PDCCH (or a PDSCH) is to be monitored, information regarding a CORESET associated with the BWP, among other examples. In some situations, base station 110 may provide the notification via a MAC layer of the BWP associated with the default operating mode.

Base station 110 may cause UE 105 to operate in the default operating mode until base station 110 has obtained a sufficient amount of traffic information regarding UE 105. In some implementations, the default operating mode may be determined by a network planner. As shown in FIG. 1B, the default operating mode may be the first operating mode. The default operating mode identified in FIG. 1B is merely provided as an example. In practice, the default operating mode may be an operating mode different than the first operating mode, in different situations.

Figure 1C:
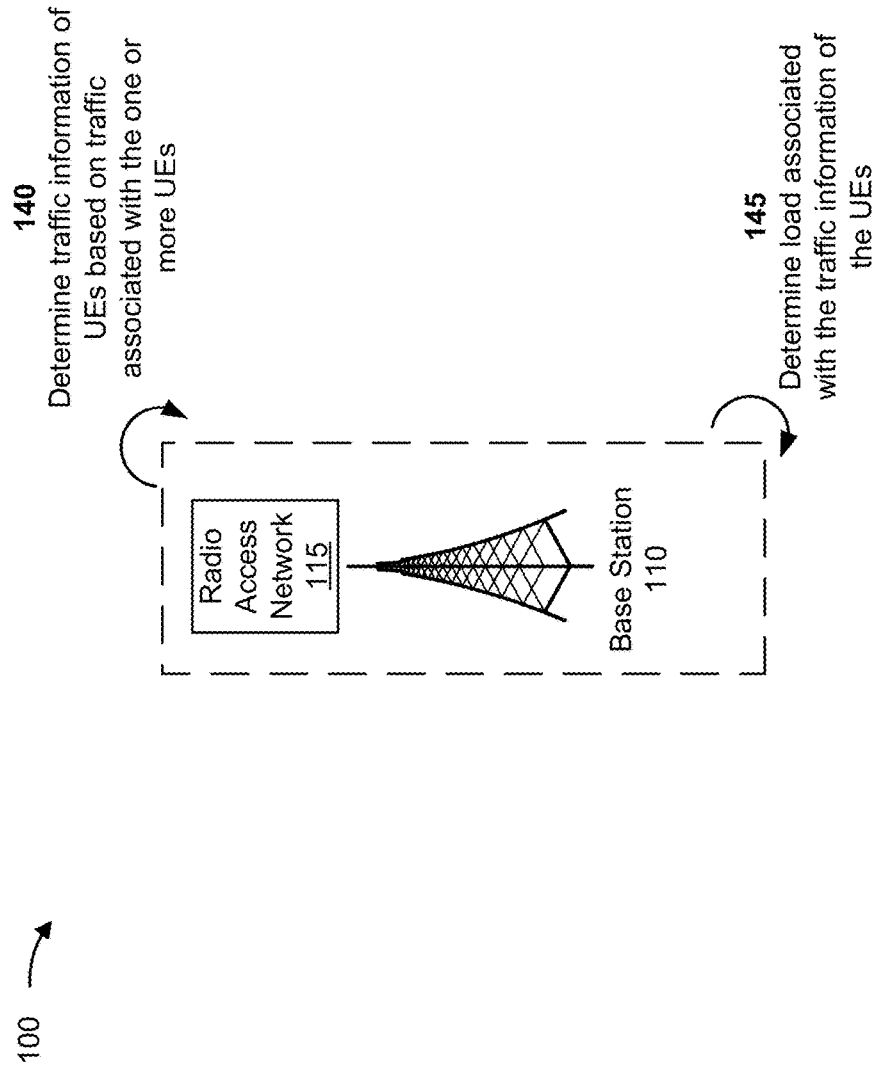

As shown in FIG. 1C, and by reference number 140, base station 110 may determine traffic information of UEs based on traffic associated with the one or more UEs. For example, base station 110 may determine the traffic information of all UEs that have established a communication session with base station 110. For instance, base station 110 may determine traffic information (e.g., traffic statistics of a traffic flow) for each of the UEs that have established a communication session with base station 110.

As an example, the traffic information of UE 105 may include packet information regarding packets (e.g., PDUs) exchanged between UE 105 and base station 110, latency information regarding a latency requirement associated with UE 105 (e.g., associated with the application executed by UE 105), and/or PDCCH aggregation level information that is used to communicate control commands with UE 105. In some implementations, aggregation level information may include information identifying different frequency bands via which UE 105 may communicate.

In some implementations, the packet information may include information regarding a quantity of packets (e.g., PDUs) exchanged between UE 105 and base station 110 and/or information regarding a packet size of packets exchanged between UE 105 and base station 110. In some situations, when determining the packet information, base station 110 may compute an average of packet delays and an average of packet size. As an example, base station 110 may compute simple averages for a predetermined number of packets and may compute moving averages for subsequent packets.

Base station 110 may determine the traffic information in order to identify an operating mode suitable for UE 105. In some situations, in order to determine the operating mode, base station 110 may determine a buffer occupancy of UE 105, radio frequency conditions associated with UE 105, a number of active UEs on a cell of base station 110, an inactivity timer indicating a period of inactivity of UE 105, among other examples. Base station 110 may determine the traffic information for other UEs (of the UEs that have established a communication session with base station 110) in a similar manner.

In some implementations, base station 110 may determine the traffic information using a model that is trained to predict traffic information of traffic flows for different UEs. In some examples, base station 110 may use and train a machine learning model. Additionally, or alternatively, a different device may generate and train the machine learning model.

The machine learning model may be trained based on historical data that includes historical scheduled data to be exchanged between historical UEs and base station 110, historical packet delays associated with the historical scheduled data, historical buffer occupancy for the historical UEs, historical radio frequency conditions, historical resource utilizations, among other examples. In some examples, base station 110 may provide, as input to the machine learning model, information regarding scheduled data to be exchanged between UE 105 and base station 110. The machine learning model may provide, as output, the traffic information of UE 105.

As shown in FIG. 1C, and by reference number 145, base station 110 may determine a load associated with the traffic information of the UEs. For example, the UEs may be configured to operate in different operating modes, and different resources may be allocated to each operating mode. Base station 110 may determine a load (e.g., an estimated load) associated with different resources allocated for each BWP and each interlace of each BWP based on the traffic information determined as described above. For example, base station 110 may determine a load associated with first resources allocated for PDCCH monitoring on the narrowband BWP, a load associated with second resources allocated for PDSCH monitoring on the narrowband BWP, a load associated with third resources allocated for PDCCH monitoring on an interlace of the narrowband BWP, a load associated with fourth resources allocated for PDCCH monitoring on an interlace of the narrowband BWP, and so on.

As an example, when determining a load associated with resources allocated for a first UE to perform PDCCH monitoring on a BWP, base station 110 may determine an estimated number of slots required to convey an average PDU for the first UE. In some examples, base station 110 may determine the estimated number of slots using a formula of the form:

$$\text{Estimated\_Slots\_Per\_PDU}j = \text{Mean\_PDU}j / Rj / \text{NRB\_}x,$$

where Estimated_Slots_Per_PDUj is the estimated number of slots, Mean_PDUj is mean packet size for the first UE, Rj is the mean number of data bits that can be conveyed per resource block for the first UE, and NRB_x is the number of resource blocks for the BWP.

Additionally, base station 110 may determine an estimated number of PDUs per second. In some examples, base station 110 may determine the estimated number of PDUs per second using formula of the form:

$$\text{Estimated\_PDUs\_Per\_Sec}j = 1.0 / \text{Mean\_}Tj,$$

where Estimated_PDUs_Per_Secj is the estimated number of PDUs per second, and Mean_Tj is the mean inter-arrival time between consecutive packets for the first UE.

Base station 110 may determine the load based on the estimated number of slots required to convey the average PDU and the estimated number of PDUs per second. For example, base station 110 may determine a quantity of CCEs per second required to communicate with the first UE via the BWP. In some examples, base station 110 may determine the quantity of CCEs per second using a formula of the form:

$$\text{Global\_CCEs\_Per\_Sec}j = AL j * \text{Estimated\_Slots\_Per\_PDU}j * \text{Estimated\_PDUs\_Per\_Sec}j,$$

where Global_CCEs_Per_Secj is the quantity of CCEs per second, ALj is a PDCCH aggregation level associated with the first UE, Estimated_Slots_Per_PDUj is the estimated number of slots, and Estimated_PDUs_Per_Secj is the estimated number of PDUs per second.

Base station 110 may convert the quantity of CCEs to the load. For example, base station 110 may convert the quantity of CCEs to the load based on a formula of the form:

$$\text{Global\_PDCCH\_Load} = \text{Global\_CCEs\_Per\_Sec}j / \text{Total\_CCEs\_Per\_Sec\_For\_The\_BWP\_Of\_Interest},$$

where Global_PDCCH_Load is the quantity of CCEs, Global_CCEs_Per_Secj is the quantity of CCEs per second, and Total_CCEs_Per_Sec_For_The_BWP_Of_Interest is the total CCEs per second for the BWP.

Base station 110 may perform similar operations for all first UEs operating in the BWP and combine resulting loads in order to determine a load associated with resources allocated for all of the first UEs that are configured to perform PDCCH monitoring on the BWP. Base station 110 may perform similar operation to determine a load associated with resources allocated for second UEs configured to perform PDCCH monitoring on an interlace of the BWP. For example, base station 110 may determine a quantity of CCEs per second required to communicate with a second UE (of the second UEs) via the interlace of the BWP. Base station 110 may determine the quantity of CCEs per second using a formula of the form:

$$\text{Interlace\_CCEs\_Per\_Sec}j = AL j * \text{Estimated\_PDUs\_Per\_Second},$$

where Interlace_CCEs_Per_Secj is the quantity of CCEs, ALj is a PDCCH aggregation level associated with the second UE, and Estimated_PDUs_Per_Second is the estimated number of PDUs per second.

Base station 110 may convert the quantity of CCEs to the load. For example, base station 110 may convert the quantity of CCEs to the load based on a formula of the form:

$$\text{Interlace\_PDCCH\_Load1} = \text{Interlace\_CCEs\_Per\_Sec}j / \text{Ncce\_per\_sec\_}x\text{\_interlace\_}x,$$

where Interlace_PDCCH_Loadj is the load, Interlace_CCEs_Per_Secj is the quantity of CCEs, and Ncce_per_sec_x_interlace_x is the total number of CCEs per second for the interlace of the BWP.

Base station 110 may perform similar operations for each second UE (of the second UEs) and combine resulting loads to determine a load associated with resources allocated for the second UEs configured to perform PDCCH monitoring on the interlace of the BWP.

Base station 110 may determine a load associated with resources allocated for third UEs to perform PDSCH monitoring on a BWP. When determining a load associated with resources allocated for a third UE (of the third UEs) to perform PDSCH monitoring on a BWP, base station 110 may determine an estimated number of resource blocks required to convey an average PDU for the third UE. In some examples, base station 110 may determine the estimated number of resource blocks using a formula of the form:

$$\text{Estimated\_RBs\_Per\_PDU} = \text{Average\_PDU\_Size} / \text{UE\_Data\_Rate\_Per\_}Rb,$$

where Estimated_RBs_Per_PDU is the estimated number of resource blocks, Average_PDU_Size is an average PDU size for the third UE, and UE_Data_Rate_Per_Rb is a current data rate per resource block for the third UE.

Additionally, base station 110 may determine an estimated number of PDUs per second. In some examples, base station 110 may determine the estimated number of PDUs per second using a formula of the form:

$$\text{Estimated\_PDUs\_Per\_Sec}j = 1.0 / \text{Mean\_}Tj,$$

where Estimated_PDUs_Per_Secj is the estimated number of PDUs per second and Mean_Tj is the mean inter-arrival time between consecutive packets for the third UE.

Base station 110 may determine the load based on the estimated number of resource blocks required to convey the average PDU and the estimated number of PDUs per second. For example, base station 110 may determine a quantity of resource blocks per second required to communicate with the UE via the BWP. In some examples, base station 110 may determine the quantity of resource blocks per second using a formula of the form:

$$\text{Global\_RBs\_Per\_Sec} = \text{Estimated\_RBs\_Per\_PDU} * \text{Estimated\_PDUs\_Per\_Sec},$$

where Global_RBs_Per_Sec is the quantity of resource blocks per second, Estimated_RB_Per_PDU is the estimated number of resource blocks per PDU, and Estimated_PDUs_Per_Sec is the estimated number of PDUs per second.

Base station 110 may convert the quantity of resource blocks to the load based on a formula of the form:

$$\text{Global\_PDSCH\_Load} = \text{Global\_RBs\_Per\_Sec} / \text{Total\_RBs\_Per\_Sec\_For\_The\_BWP\_Of\_Interest},$$

where Global_PDSCH_Load is the load, Global_RBs_Per_Sec is the quantity of resource blocks per second, and Total_RBs_Per_Sec_For_The_BWP_Of_Interest is the total resource blocks per second for the BWP.

Base station 110 may perform similar operations for all other third UEs and combine resulting loads to determine a load associated with the resources allocated for the third UEs to perform PDSCH monitoring on the BWP. Base station 110 may perform similar operations to determine a load associated with resources allocated for fourth UEs configured to perform PDSCH monitoring on the interlace of the BWP. For example, base station 110 may determine a quantity of resource blocks per second required to communicate with a fourth UE (of the fourth UEs) via the interlace of the BWP. Base station 110 may determine the quantity of resource blocks per second using a formula of the form:

$$\text{Interlace\_RBs\_Per\_Sec} = \min(\text{Estimated\_RBs\_Per\_PDU}, \text{RBs\_Per\_BWP}) * \text{Estimated\_PDUs\_Per\_Second},$$

where Interlace_RBs_Per_Secj is the quantity of resource blocks, Estimated_RBs_Per_PDU is an estimated quantity of resource blocks per PDU, RBs_Per_BWP is an estimated quantity of resource blocks per BWP, and Estimated_PDUs_Per_Second is the estimated number of PDUs per second.

Base station 110 may convert the quantity of resource blocks to the load. For example, base station 110 may convert the quantity of resource blocks to the load based on a formula of the form:

$$\text{Interlace\_PDSCH\_Load} = \text{Interlace\_RBs\_Per\_Sec} / \text{Total\_RBs\_Per\_Sec\_For\_This\_Interlace\_In\_the\_BWP\_of\_Interest},$$

where Interlace_PDSCH_Load is the load, Interlace_RBs_Per_Sec is the quantity of resource blocks, and Total_RBs_Per_Sec_For_This_Interlace_In_the_BWP_of_Interest is the total number of resource blocks per second for the interlace of the BWP.

Base station 110 may perform similar operations for all other fourth UEs and combine resulting loads to determine a load associated with the resources allocated for the fourth UEs to perform PDSCH monitoring on the interlace of the BWP.

Figure 1D:
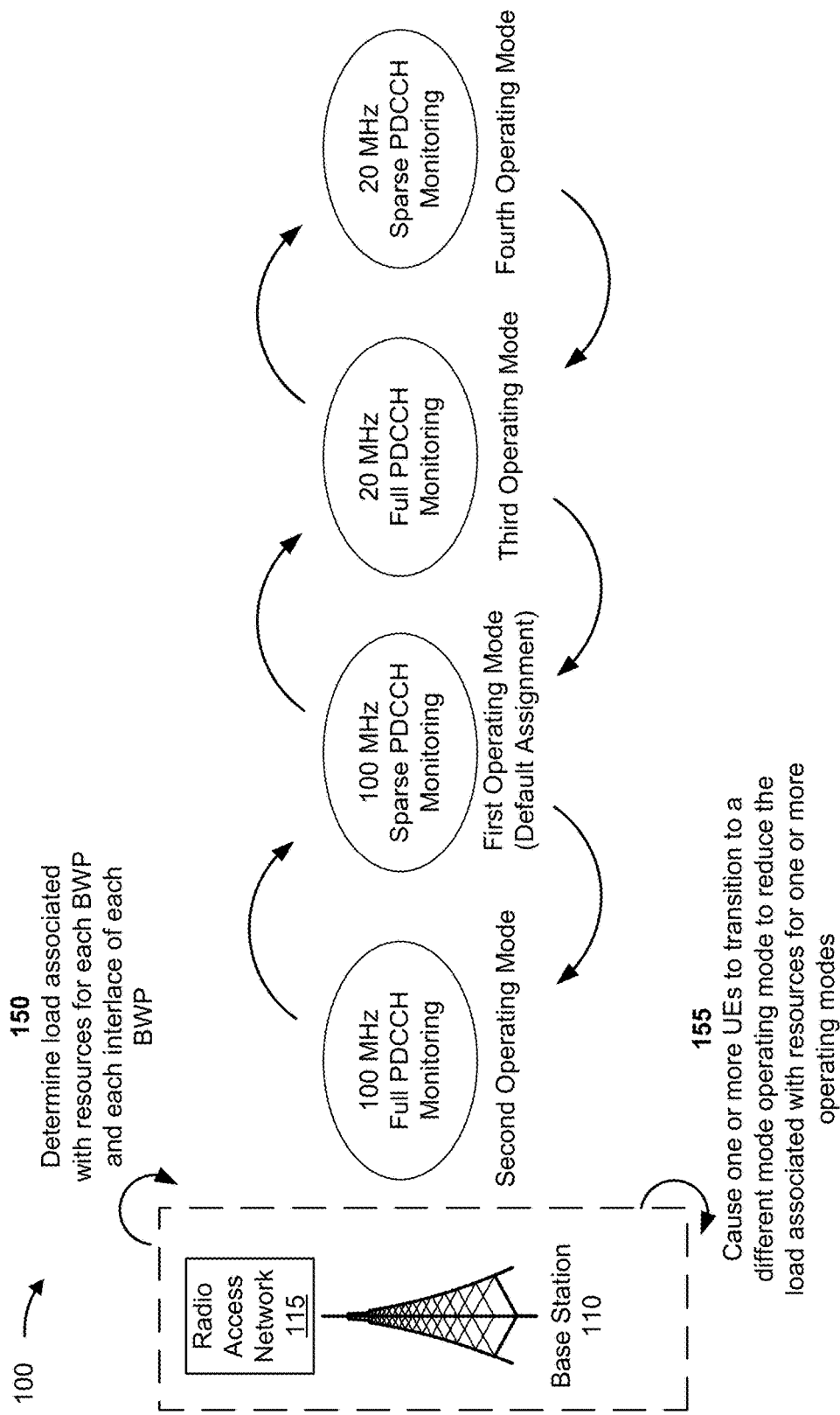

As shown in FIG. 1D, and by reference number 150, base station 110 may update a current load associated with resources allocated for each BWP and each interlace of each BWP. In some implementations, information identifying the current load associated with resources, allocated for each BWP and each interlace of each BWP, may be stored in a memory associated with base station 110. In some examples, base station 110 may update the current load based on the estimated load determined as described above for the resources allocated for each BWP and for each interlace of each BWP. For instance, base station 110 may reset the current load (associated with different resources, allocated for each BWP and each interlace of each BWP). After resetting the current load, base station 110 may set the current load (associated with different resources, allocated for each BWP and each interlace of each BWP) to a corresponding estimated load determined for the resources allocated for each BWP and for each interlace of each BWP.

For example, base station 110 may set the current load (associated with the resources allocated for PDCCH monitoring on the narrowband BWP) to the estimated load associated with the resources allocated for PDCCH monitoring on the narrowband BWP, set the current load (associated with the resources allocated for PDSCH monitoring on the narrowband BWP) to the estimated load associated with the resources allocated for PDSCH monitoring on the narrowband BWP, and so on.

As shown in FIG. 1D, and by reference number 155, base station 110 may cause one or more UEs to transition to a different operating mode to reduce the load associated with resources allocated for one or more operating modes. For example, for each operating mode, base station 110 may determine whether the load, associated with resources allocated for each BWP, satisfies a second load threshold by comparing the load to the second load threshold. In some implementations, base station 110 may perform the comparison in a decreasing order of operating modes. The second load threshold may exceed the first load threshold and may be determined by the network planner.

In some examples, with respect to the fourth operating mode, if base station 110 determines that the load (associated with resources allocated for the BWP of the fourth operating mode) exceeds the second load threshold, base station 110 may identify UEs that no longer meet criteria associated with the fourth operating mode (e.g., as described above). For example, base station 110 may compare the traffic information of each UE (assigned to the fourth operating mode) to the criteria associated with the fourth operating mode. Based on the comparison, base station 110 may identify the UEs that no longer meet the criteria and configure the UEs to be transitioned to a different operating mode (e.g., the third operating mode). Base station 110 may cause a notification to be provided to the UEs regarding the transition to the third operating mode in a manner similar to the manner described above.

After causing the UEs to be transitioned as described above, base station 110 may determine whether an updated load (associated with the resources allocated for the BWP of the fourth operating mode) continues to exceed the second load threshold. If base station 110 determines that the updated load (associated with the resources allocated for the BWP of the fourth operating mode) continues to exceed the second load threshold, base station 110 may cause one or more additional UEs to transition to the third operating mode. The one or more additional UEs may be UEs that least meet the criteria (associated with the fourth operating mode) out of remaining UEs assigned to the fourth operating mode.

Base station 110 may perform similar actions with respect to other operating modes. For example, if base station 110 determines that the load (associated with resources allocated for the BWP of the third operating mode) exceeds the second load threshold, base station 110 may identify UEs that no longer meet criteria associated with the third operating mode and configure the UEs to be transitioned to a different operating mode (e.g., the second operating mode). Base station 110 may perform similar actions with respect to the load associated with resources allocated for each interlace of each BWP.

Figure 1E:
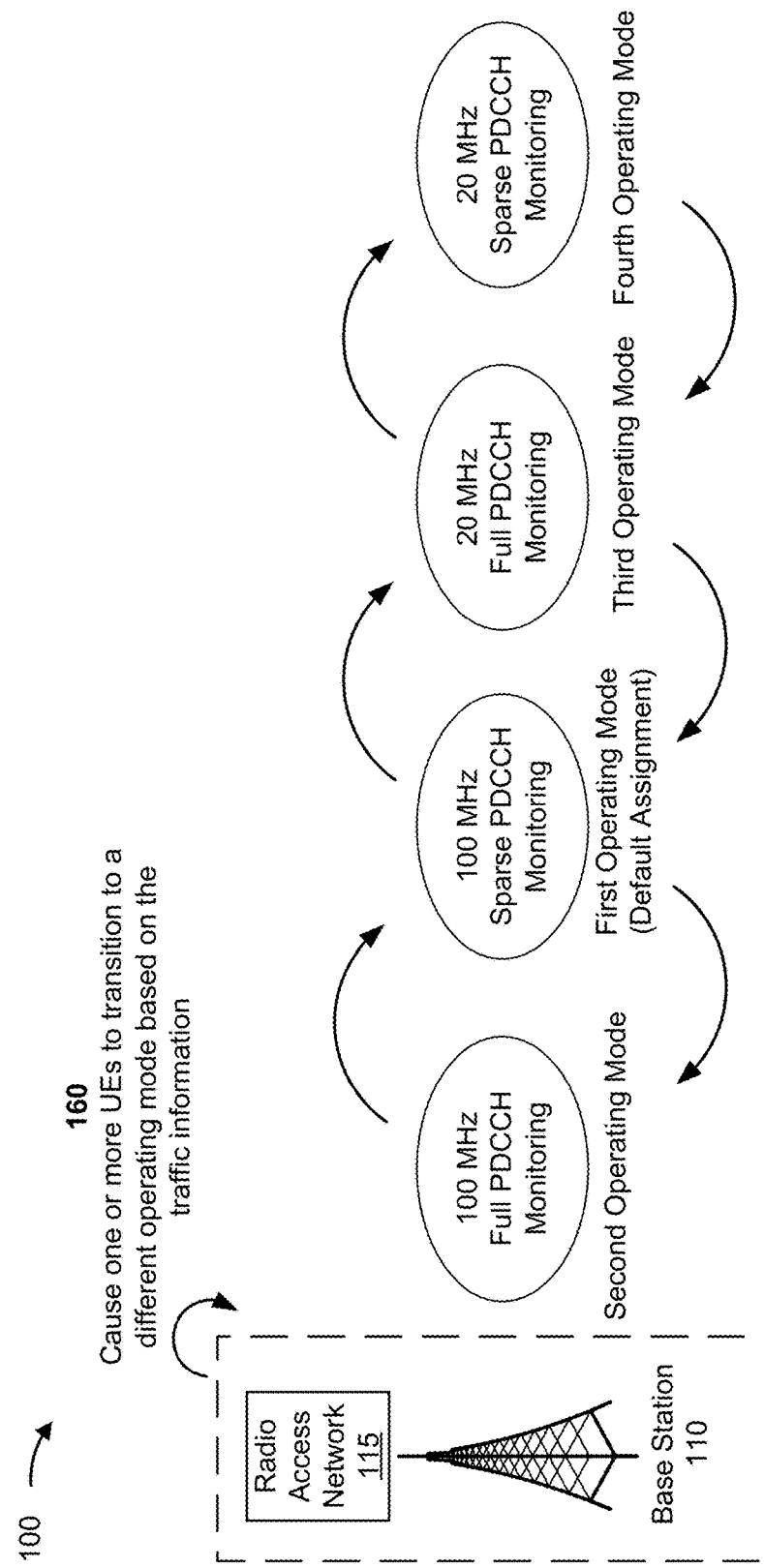

As shown in FIG. 1E, and by reference number 160, base station 110 may cause one or more UEs to transition to a different operating mode based on the traffic information. In some implementations, for each operating mode, base station 110 may determine whether a UE, assigned to the operating mode, is to be transitioned to a different operating mode. The UE may be transitioned between different operating modes based on a change in an amount of bandwidth required for data transmission associated with the UE.

For example, base station 110 may analyze the traffic information of the UE to identify an operating mode that is more suitable for transmission of data associated with the UE. For example, a UE assigned to the fourth operating mode may be transitioned to the third operating mode when additional transmission rate capability is required for transmission of data associated with the UE. Similarly, a UE assigned to the third operating mode may be transitioned to the first operating mode when additional bandwidth is required for transmission of data associated with the UE. Similarly, a UE assigned to the first operating mode may be transitioned to the second operating mode when additional transmission opportunities are required for transmission of data associated with the UE.

With respect to UE 105, for example, base station 110 may cause UE 105 to transition from operating in the first operating mode to operating in the second operating mode when additional transmission opportunities are required for transmission of data associated with UE 105. In some implementations, base station 110 may cause UEs to transition between operating modes based on a buffer occupancy associated with the UEs. For example, base station 110 may cause UE 105 to transition from operating in the first operating mode to operating in the second operating mode when a buffer occupancy of UE 105 increases.

Figure 1F:
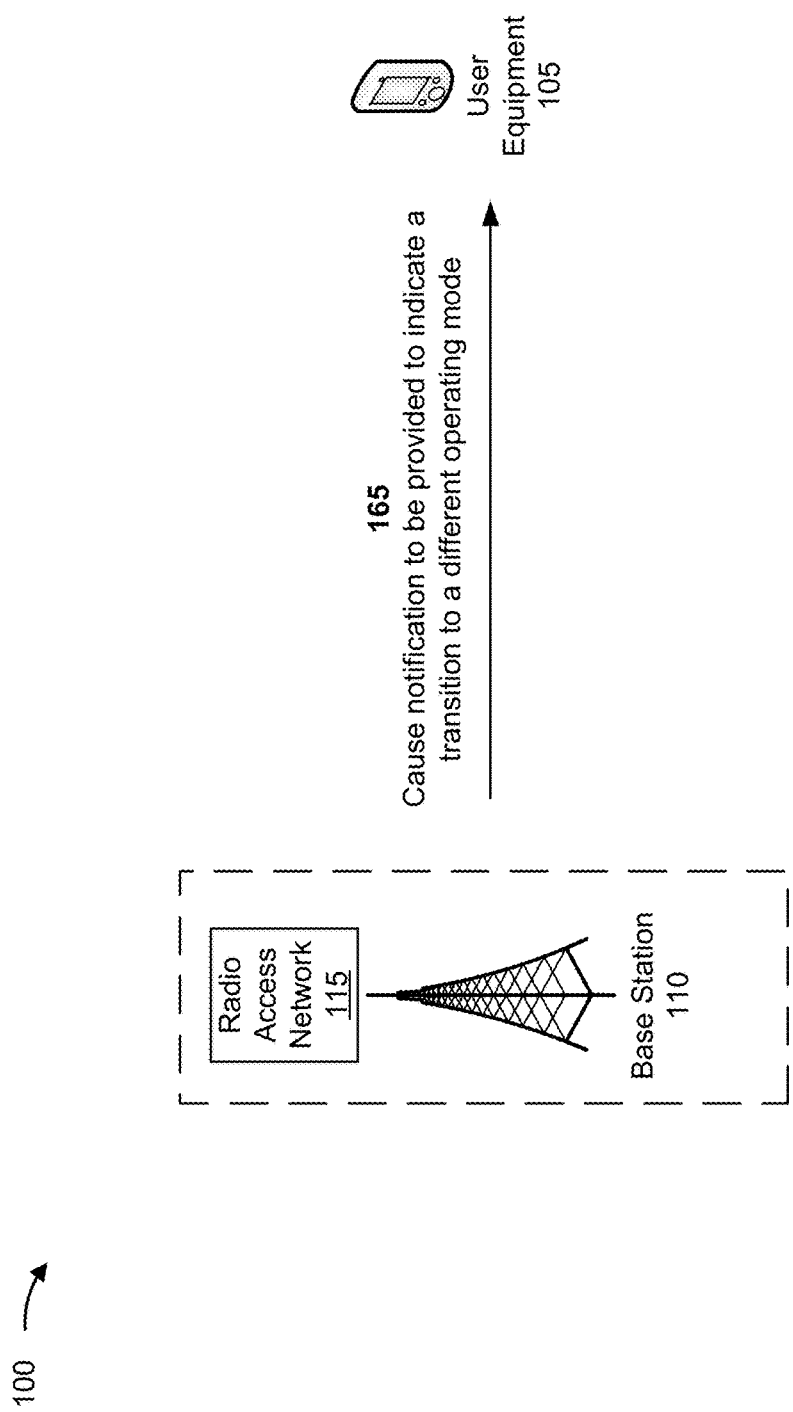

As shown in FIG. 1F, and by reference number 165, base station 110 may cause a notification to be provided to indicate a transition to a different operating mode. For example, as part of configuring UE 105 to transition to the second operating mode, base station 110 may cause a notification to be provided to UE 105 via the MAC layer, in a manner similar to the manner described above.

By transitioning between the different operating modes in this manner, the UE may operate in a manner that improves battery consumption without degrading performance of the UE. For example, the UE may be configured for optimal battery consumption while satisfying stringent latency requirements. Additionally, transitioning between the different operating modes in this manner provides an acceptable trade-off between improved battery consumption and reduced performance.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
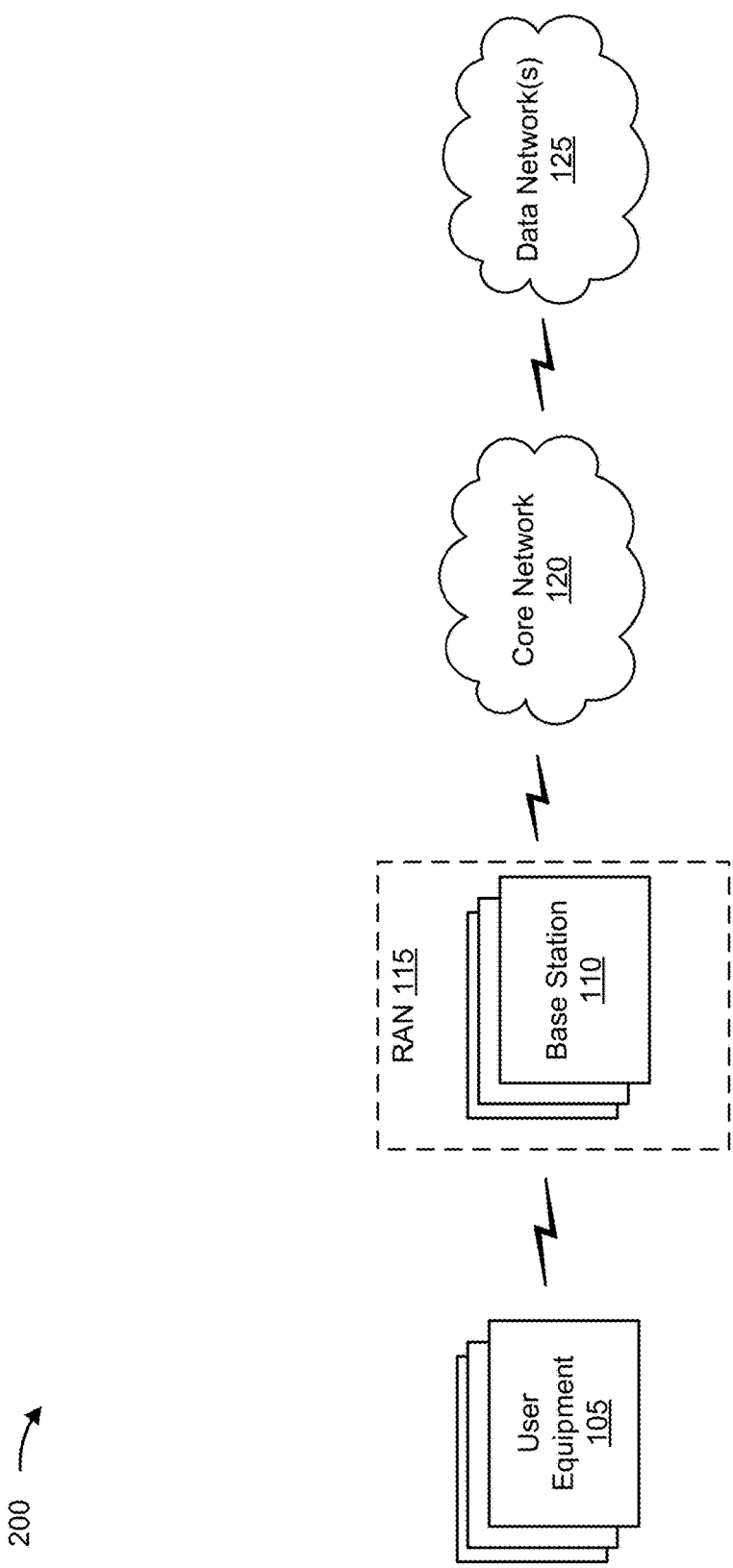
FIG. 2 is a diagram of an example environment in which systems and/or methods described herein may be implemented.

FIG. 2 is a diagram of an example environment 200 in which systems and/or methods described herein can be implemented. As shown in FIG. 2, environment 200 can include UE 105, base station 110, RAN 115, core network 120, and data network(s) 125. Devices of environment 200 can interconnect via wired connections, wireless connections, or a combination of wired and wireless connections.

UE 105 includes one or more devices capable of communicating with RAN 115 and/or a data network 125 (e.g., via core network 120). For example, UE 105 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 105 can be capable of communicating using uplink (e.g., UE to RAN) communications, downlink (e.g., RAN to UE) communications, and/or sidelink (e.g., UE-to-UE) communications. In some implementations, UE 105 can include a machine-type communication (MTC) UE, such as an evolved or enhanced MTC (eMTC) UE. In some implementations, UE 105 can include an Internet of things (IoT) UE, such as a narrowband IoT (NB-IoT) UE, among other examples.

RAN 115 includes one or more devices capable of communicating with UE 105 using a cellular radio access technology (RAT). For example, RAN 115 can include a base station 110, a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, base station 110 has the same characteristics and functionality of RAN 115, and vice versa. RAN 115 can transfer traffic between UE 105 (e.g., using a cellular RAT), one or more other RANs 115 (e.g., using a wireless interface or a backhaul interface, such as a wired backhaul interface), and/or core network 120. RAN 115 can provide one or more cells that cover geographic areas. Some RANs 115 can be mobile base stations. Some RANs 115 can be capable of communicating using multiple RATs.

In some implementations, RAN 115 can perform scheduling and/or resource management for UEs 105 covered by RAN 115 (e.g., UEs 105 covered by a cell provided by RAN 115). In some implementations, RAN 115 can be controlled or coordinated by a network controller, which can perform load balancing, network-level configuration, and/or the like. The network controller can communicate with RAN 115 via a wireless or wireline backhaul. In some implementations, RAN 115 can include a network controller, a self-organizing network (SON) module or component, or a similar module or component. In other words, RAN 115 can perform network control, scheduling, and/or network management functions (e.g., for other RAN 115 and/or for uplink, downlink, and/or sidelink communications of UEs 105 covered by RAN 115). In some implementations, RAN 115 can apply network slice policies to perform the network control, scheduling, and/or network management functions. In some implementations, RAN 115 can include a central unit and multiple distributed units. The central unit can coordinate access control and communication with regard to the multiple distributed units. The multiple distributed units can provide UEs 105 and/or other RANs 115 with access to data network 125 via core network 120.

Core network 120 includes various types of core network architectures, such as a 5G Next Generation (NG) Core, an LTE Evolved Packet Core (EPC), among other examples. In some implementations, core network 120 can be implemented on physical devices, such as a gateway, a mobility management entity, among other examples. In some implementations, the hardware and/or software implementing core network 120 can be virtualized (e.g., through the use of network function virtualization and/or software-defined networking), thereby allowing for the use of composable infrastructure when implementing core network 120. In this way, networking, storage, and compute resources can be allocated to implement the functions of core network 120 in a flexible manner as opposed to relying on dedicated hardware and software to implement these functions.

Data network 125 includes one or more wired and/or wireless data networks. For example, data network 125 can include an Internet Protocol (IP) Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, or an operator services network, among other examples, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
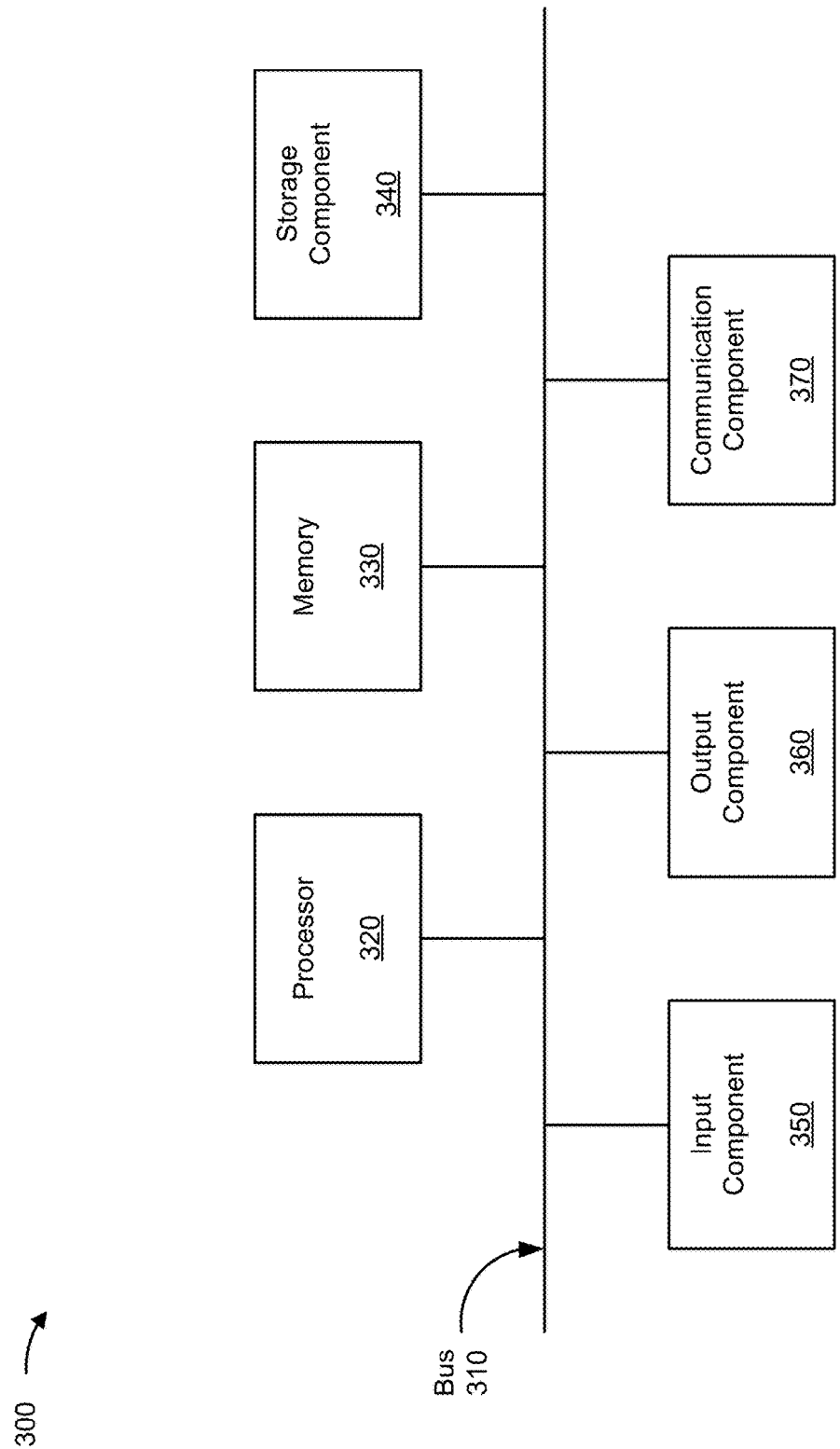
FIG. 3 is a diagram of example components of one or more devices of FIG. 2.

FIG. 3 is a diagram of example components of a device 300, which may correspond to base station 110 and/or UE 105. In some implementations, base station 110 and/or UE 105 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
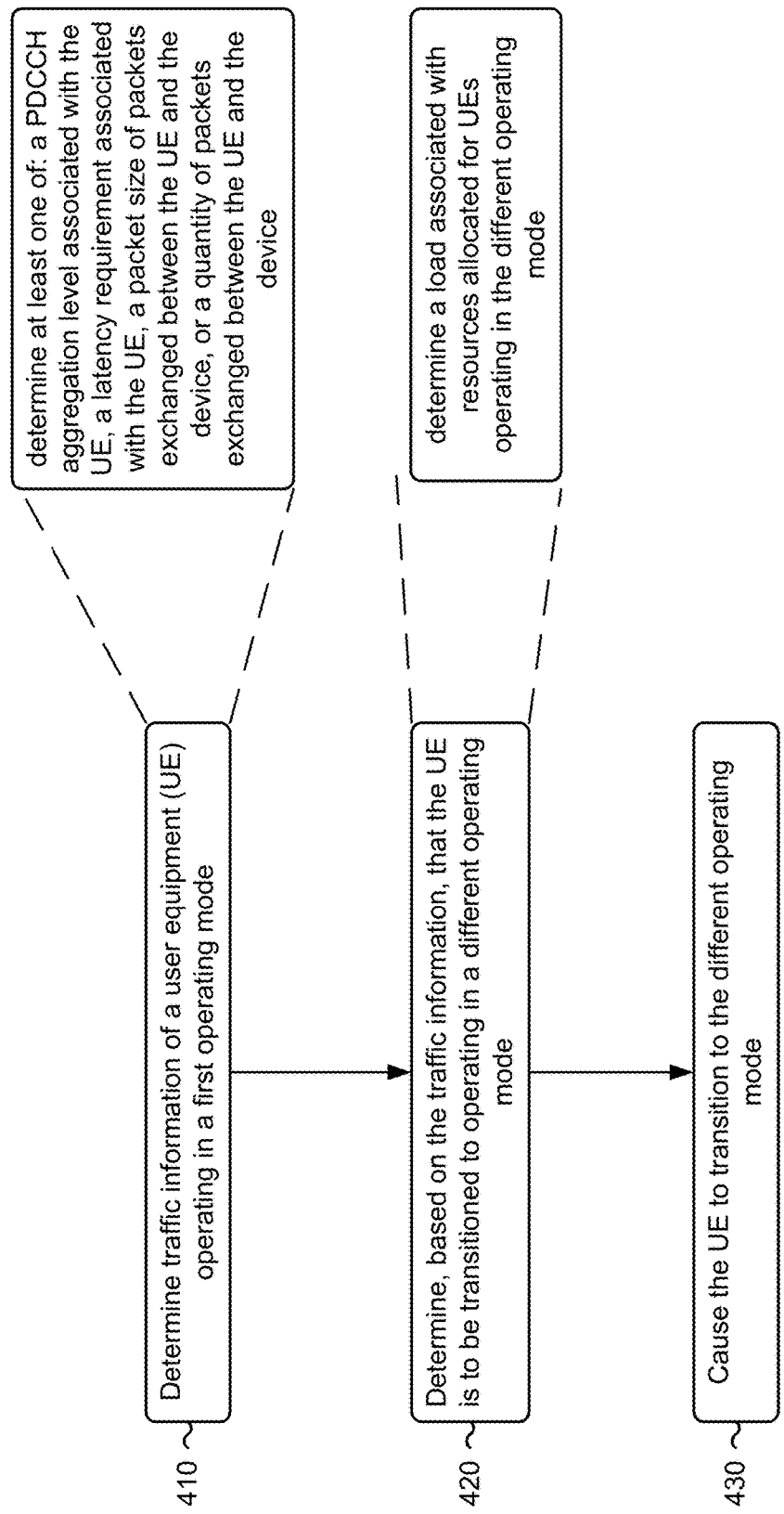
FIG. 4 is a flowchart of an example process relating to transitioning between operating modes associated with bandwidth parts.

FIG. 4 is a flowchart of an example process 400 relating to transitioning between operating modes associated with bandwidth parts. In some implementations, one or more process blocks of FIG. 4 may be performed by a device (e.g., base station 110). In some implementations, one or more process blocks of FIG. 4 may be performed by another device or a group of devices separate from or including a UE (e.g., UE 105). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include determining traffic information of a UE operating in a first operating mode, wherein the first operating mode is associated with the UE monitoring a PDCCH, via a first BWP, according to a first rate (block 410). For example, base station 110 may determine traffic information of a UE operating in a first operating mode, wherein the first operating mode is associated with the UE monitoring a PDCCH, via a first BWP, according to a first rate, as described above.

In some implementations, determining the traffic information comprises: determining at least one of: a PDCCH aggregation level associated with the UE, a latency requirement associated with the UE, a packet size of packets exchanged between the UE and the device, or a quantity of packets exchanged between the UE and the device, and determining that the UE is to be transitioned to operating in the different operating mode comprises determining, based on the traffic information, that the UE is to be transitioned to operating in the different operating mode based on the at least one of the PDCCH aggregation level, the latency requirement, the packet size of packets, or the quantity of packets.

In some implementations, the first capability information includes information regarding requested compute capabilities of the first set of devices, information regarding requested storage capabilities of the first set of devices, and information regarding requested network connectivity capabilities of the first set of devices. In some implementations, the first capability information further includes at least one of information associated with optimizing a performance of the first set of devices, information associated with monitoring the performance of the first set of devices, information associated with resource schedulers associated with the first set of devices, or information associated with locations of the first set of devices.

In some implementations, process 400 includes establishing a communication session with the UE, prior to determining the traffic information of the UE, and causing the UE to operate in the first operating mode based on establishing the communication session, wherein the first operating mode is a default operating mode.

As further shown in FIG. 4, process 400 may include determining, based on the traffic information, that the UE is to be transitioned to operating in a different operating mode including one of: a second operating mode associated with monitoring the PDCCH, via the first BWP, according to a second rate that exceeds the first rate, a third operating mode associated with monitoring the PDCCH, via a second BWP that is less than the first BWP, according to the second rate, or a fourth operating mode associated with monitoring the PDCCH, via the second BWP, according to the first rate (block 420).

For example, base station 110 may determine, based on the traffic information, that the UE is to be transitioned to operating in a different operating mode including one of: a second operating mode associated with monitoring the PDCCH, via the first BWP, according to a second rate that exceeds the first rate, a third operating mode associated with monitoring the PDCCH, via a second BWP that is less than the first BWP, according to the second rate, or a fourth operating mode associated with monitoring the PDCCH, via the second BWP, according to the first rate, as described above.

As further shown in FIG. 4, process 400 may include causing the UE to transition to the different operating mode based on determining that the UE is to be transitioned to operating in the different operating mode (block 430). For example, base station 110 may cause the UE to transition to the different operating mode based on determining that the UE is to be transitioned to operating in the different operating mode, as described above.

In some implementations, causing the UE to transition to the different operating mode comprises: determining a load associated with resources allocated for UEs operating in the different operating mode; and causing the UE to transition to the different operating mode based on the load.

In some implementations, causing the UE to transition to the different operating mode comprises: determining that the load does not satisfy a load threshold; and causing the UE to transition to the different operating mode based on determining that the load does not satisfy the load threshold.

In some implementations, the UE may be a first UE, the load threshold may be a first load threshold, and process 400 further includes: causing a second UE to transition to the different operating mode; determining that the load satisfies a second load threshold that exceeds the first load threshold after causing the second UE to transition to the different operating mode; and causing one or more UEs, of the UEs operating in the different operating mode, to operate in one of the third operating mode or the fourth operating mode.

In some implementations, process 400 further includes causing a notification to be provided to the UE, wherein the notification indicates that the UE has been transitioned to operating in the different operating mode.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a device, the method comprising:
   determining that a user equipment (UE) is to transition between operating modes based on traffic associated with the UE or a load associated with the traffic,
   wherein the operating modes include of:
      a first operating mode associated with the UE monitoring a communication channel, via a first amount of bandwidth, according to a first rate,
      a second operating mode associated with the UE monitoring the communication channel, via the first amount of bandwidth, according to a second rate,
      a third operating mode associated with the UE monitoring the communication channel, via a second amount of bandwidth, according to the second rate, and
      a fourth operating mode associated with the UE monitoring the communication channel, via the second amount of bandwidth, according to the first rate; and
   causing the UE to transition between the operating modes based on determining that the UE is to transition between the operating modes.

2. The method of claim 1, further comprising determining traffic information regarding the traffic,
   wherein determining the traffic information comprises:
      determining at least one of:
         a physical downlink control channel (PDCCH) aggregation level associated with the UE,
         a latency requirement associated with the UE,
         a packet size of packets exchanged between the UE and the device, or
         a quantity of protocol data units (PDUs) exchanged between the UE and the device, and
   wherein determining that the UE is to transition between the operating modes comprises:
      determining that the UE is to transition between the operating modes based on the at least one of the PDCCH aggregation level, the latency requirement, the packet size of packets, or the quantity of PDUs.

3. The method of claim 1, wherein the communication channel includes a physical downlink control channel (PDCCH) or a physical downlink shared channel (PDSCH).

4. The method of claim 3, further comprising determining the load,
   wherein determining the load comprises:
      determining a load associated with resources allocated for PDCCH monitoring via the first amount of bandwidth or the second amount of bandwidth.

5. The method of claim 4, wherein causing the UE to transition comprises:
   determining that the load, associated with the resources, satisfies a load threshold; and
   causing the UE to transition based on determining that the load, associated with the resources, satisfies the load threshold.

6. The method of claim 1, further comprising:
   determining an operating mode of the UE based on one or more of a buffer occupancy of the UE, radio frequency conditions associated with the UE, a number of active UEs on a cell of the device, or an inactivity timer indicating a period of inactivity of the UE.

7. The method of claim 1, wherein causing the UE to transition between the operating modes comprises:
   causing the UE to transition between the first operating mode and the second operating mode;
   causing the UE to transition between the first operating mode and the third operating mode; or
   causing the UE to transition between the third operating mode and the fourth operating mode.

8. The method of claim 1, wherein the second rate that exceeds the first rate, and
   wherein the second amount of bandwidth that is less than the first amount of bandwidth.

9. A device, comprising:
   one or more processors configured to:
      determine an operating mode of a user equipment (UE), wherein the UE is configured to operate in different operating modes that include:

a first operating mode associated with the UE monitoring a communication channel, via a first amount of bandwidth, according to a first rate, a second operating mode associated with the UE monitoring the communication channel, via the first amount of bandwidth, according to a second rate, a third operating mode associated with the UE monitoring the communication channel, via a second amount of bandwidth, according to the second rate, and a fourth operating mode associated with the UE monitoring the communication channel, via the second amount of bandwidth, according to the first rate; and cause the UE to operate in the operating mode.

10. The device of claim 9, wherein the one or more processors are further configured to:

determine traffic associated with the UE; and determine that the UE is to operate in the operating mode based on the traffic.

11. The device of claim 9, wherein the communication channel includes a physical downlink control channel (PDCCH), and wherein the one or more processors are further configured to:

determine a load associated with resources allocated for PDCCH monitoring via the first amount of bandwidth or the second amount of bandwidth; and determine that the UE is to operate in the operating mode based on the load.

12. The device of claim 11, wherein the one or more processors are further configured to:

determine an estimated number of slots for conveying an average protocol data unit (PDU) for the UE;

determine an estimated number of PDUs per second; and determine the load based on the estimated number of slots and the estimated number of PDUs per second.

13. The device of claim 12, wherein the one or more processors are further configured to:

determine a quantity of control channel elements (CCEs) per second for communicating with the UE via the first amount of bandwidth or the second amount of bandwidth, wherein the quantity of CCEs is determined based on the estimated number of slots and the estimated number of PDUs per second; and determine the load based on the quantity of CCEs.

14. The device of claim 9, wherein the one or more processors, to cause the UE to operate in the operating mode, are configured to:

cause the UE to transition between the first operating mode and the second operating mode;

cause the UE to transition between the first operating mode and the third operating mode; or cause the UE to transition between the third operating mode and the fourth operating mode.

15. The device of claim 9, wherein the one or more processors are configured to:

analyze traffic information regarding traffic associated with the UE; and identify, based on analyzing the traffic information, the operating mode as an operating mode for transmission of data associated with the UE.

16. A non-transitory computer-readable medium storing a set of instructions, the set of instructions comprising:

one or more instructions that, when executed by one or more processors of a device, cause the device to:

determine that a user equipment (UE) is to transition between different operating modes based on traffic associated with the UE or a load associated with the traffic, wherein the different operating modes are associated with the UE monitoring a communication channel, via different amounts of bandwidth, according to different rates, and wherein the communication channel includes a physical downlink control channel (PDCCH) or a physical downlink shared channel (PDSCH); and cause the UE to transition between the operating modes based on determining that the UE is to transition between the operating modes.

17. The non-transitory computer-readable medium of claim 16, wherein the different operating modes include:

a first operating mode associated with the UE monitoring a communication channel, via a first amount of bandwidth, according to a first rate, a second operating mode associated with the UE monitoring the communication channel, via the first amount of bandwidth, according to a second rate, a third operating mode associated with the UE monitoring the communication channel, via a second amount of bandwidth, according to the second rate, and a fourth operating mode associated with the UE monitoring the communication channel, via the second amount of bandwidth, according to the first rate.

18. The non-transitory computer-readable medium of claim 17, wherein the one or more instructions, that cause the UE to transition between the different operating modes, cause the device to:

determine that additional transmission opportunities is to be used for transmission of data associated with the UE; and cause the UE to transition from the first operating mode to the second operating mode based on determining that additional transmission opportunities is to be used for transmission of data associated with the UE.

19. The non-transitory computer-readable medium of claim 17, wherein the one or more instructions, that cause the UE to transition between the different operating modes, cause the device to:

determine that additional transmission rate capability is to be used for transmission of data associated with the UE; and cause the UE to transition from the fourth operating mode to the third operating mode based on determining that additional transmission rate capability is to be used for transmission of data associated with the UE.

20. The non-transitory computer-readable medium of claim 17, wherein the one or more instructions, that cause the UE to transition between the different operating modes, cause the device to:

determine that additional bandwidth is to be used for transmission of data associated with the UE; and cause the UE to transition from the third operating mode to the first operating mode based on determining that additional bandwidth is to be used for transmission of data associated with the UE.

* * * * *